(12) United States Patent
Durack (10) Patent No.: US 10,495,196 B2
(45) Date of Patent: Dec. 3, 2019

(54) DOUBLE ROLLER TOROIDAL TRACTION DRIVE

(71) Applicant: ULTIMATE TRANSMISSIONS PTY LTD, New South Wales (AU)

(72) Inventor: Michael James Durack, New South Wales (AU)

( * ) Notice: Subject to any disclaimer, the term of this patent is extended or adjusted under 35 U.S.C. 154(b) by 254 days.

(21) Appl. No.: 15/529,418

(22) PCT Filed: Nov. 25, 2015

(86) PCT No.: PCT/AU2015/050742
§ 371 (c)(1),
(2) Date: May 24, 2017

(87) PCT Pub. No.: WO2016/081998
PCT Pub. Date: Jun. 2, 2016

(65) Prior Publication Data
US 2017/0363185 A1    Dec. 21, 2017

(30) Foreign Application Priority Data
Nov. 25, 2014   (AU) .................................. 2014904771

(51) Int. Cl.
*F16H 15/38*  (2006.01)
*F16H 15/12*  (2006.01)
*F16H 15/14*  (2006.01)
*F16H 15/40*  (2006.01)
*F16D 3/33*   (2006.01)
*F16H 61/664* (2006.01)

(52) U.S. Cl.
CPC ............ *F16H 15/38* (2013.01); *F16H 15/12* (2013.01); *F16H 15/14* (2013.01); *F16H 15/40* (2013.01); *F16D 3/33* (2013.01); *F16H 61/6649* (2013.01); *F16H 2015/383* (2013.01)

(58) Field of Classification Search
CPC .......... F16H 15/38; F16H 15/12; F16H 15/14; F16H 15/40; F16H 61/6649; F16H 2015/383
See application file for complete search history.

(56) References Cited

U.S. PATENT DOCUMENTS

| | | | | |
|---|---|---|---|---|
| 1,904,046 A * | 4/1933 | Hayes | ..................... | F16H 15/38 476/40 |
| 2,595,367 A * | 5/1952 | Picanol | ................... | F16H 15/38 476/40 |
| 3,482,461 A * | 12/1969 | Rouverol | ................ | F16H 15/12 476/54 |
| 5,214,973 A | 6/1993 | Hambric | | |
| 9,243,694 B2 * | 1/2016 | Okulov | ................... | F16H 15/40 |
| 2013/0123062 A1 | 5/2013 | Okulov | | |

FOREIGN PATENT DOCUMENTS

| | | |
|---|---|---|
| WO | 2011041851 | 4/2011 |
| WO | 2012151615 | 11/2012 |

* cited by examiner

*Primary Examiner* — David M Fenstermacher
(74) *Attorney, Agent, or Firm* — Shutts & Bowen LLP (57) ABSTRACT

Disclosed is a toroidal variable speed traction drive including a driving disc and a driven disc, with a plurality of roller assemblies in between. Each roller assembly has a toroidal rolling surface to contact the toroidal surface of the corresponding disc, and a conical surface, for engaging the other roller in the assembly. An engagement is provide to prevent or reduce axial movement between the first and second rollers along the conical surface.

4 Claims, 9 Drawing Sheets

Figure 1

PRIOR ART

PRIOR ART

DOUBLE ROLLER TOROIDAL TRACTION DRIVE

CROSS REFERENCE TO RELATED APPLICATIONS

This Non-provisional Application is a 35 U.S.C. Sect. 371 National Stage entry of PCT/AU2015/050742 entitled "DOUBLE ROLLER TOROIDAL TRACTION DRIVE", filed May 25, 2015, and claims the benefit of Australian Application No. 2014904771, filed May 25, 2014, the entireties of which are incorporated herein by reference.

TECHNICAL FIELD

The present invention relates to constantly variable transmissions (CVTs), for use in vehicles and other machines.

BACKGROUND OF THE INVENTION

CVTs are increasingly used in vehicles and other applications. The present invention is concerned with traction drive CVTs. Two major types of traction drives are used. One uses a belt running between adjustable pulley sheaves. The other, a toroidal variator, uses a roller that runs between two discs with the negative shape of a toroid machined into it.

There are two types of toroidal variator, a full toroidal variator and a half toroidal variator. These variators include discs that are clamped onto the rollers with high forces allowing the rolling contacts to transfer force using friction or traction as it is otherwise called. The present invention is concerned with full toroidal variators, and more particularly with double roller full toroidal variators, or DFTVs. In this class of device, a pair of rollers runs on two discs and also on themselves. An example is described in patent application No. PCT/AU2010/001331 by the present applicant, the disclosure of which is hereby incorporated by reference.

The DFTV disclosed therein uses two rollers, each of which is formed with both a conical surface and a toroidal surface. The toroidal surface of each roller rolls on the discs while the conical surfaces roll on each other. The clamping force from the discs is arranged so that it passes directly from one toroidal contact to the other contact and through the line where the conical contact between the rollers exists so that the two rollers are forced into a position relative to each other by the relative angles of the cones. Typically the conical angle is equal so that there is no relatively sliding of the rollers along this line caused by any force component imbalance.

Figure 1:
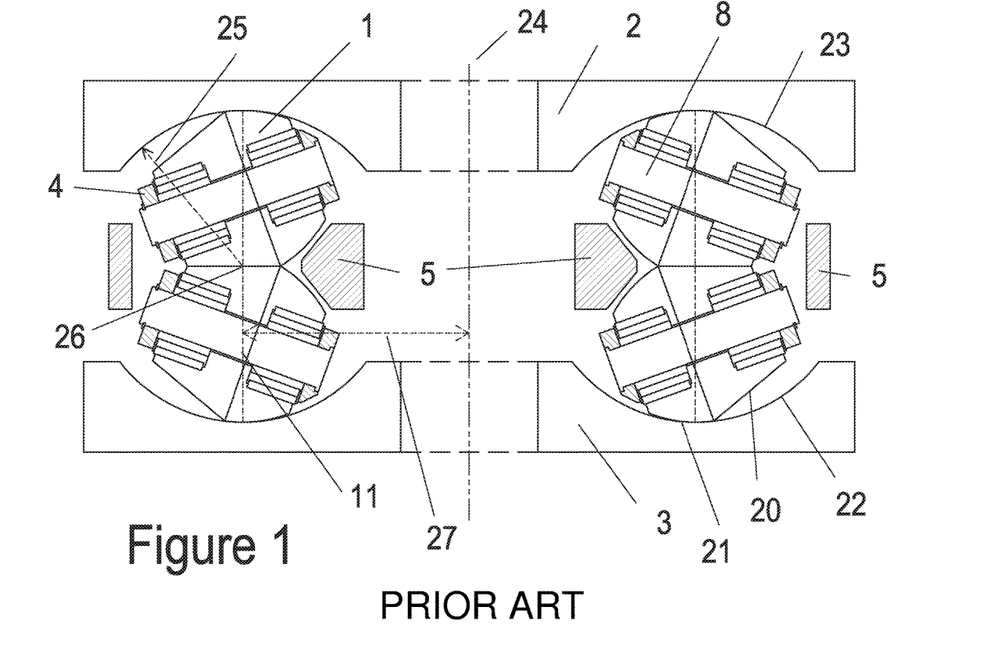
FIG. 1 shows a section through a set of rollers within a DFTV.

Prior art FIG. 1 shows a cross section through such a device where the rollers 1 are clamped between an input disc 2 with an inner surface 23 and an output disc 3 with an inner surface 22. The discs 2, 3 internally define a toroidal space. Each roller 1 has a toroidal surface 21, i.e. shaped to engage the surfaces 22, 23 of the toroidal surface, as well as a conical surface 20 for engaging the other roller in the pair. The clamping force is resisted by rollers 1 along the reaction line 11. The rollers 1 are supported on axles 8 that are captured in yokes 4, which are in turn attached to trunnions 5. The clamping force is resisted along the line 11 that joins the two points of contact of each roller with each disc. The rollers are connected to trunnions 5 with a form of typically flexible connection allowing one or more degrees of freedom of movement but in a way that allows tangential forces to be transferred from one disc to the other.

Patent application PCT/AU2012/000476 by the present applicant, the disclosure of which is hereby incorporated by reference, describes a method of controlling roller position that can be applied to both double roller and single roller designs.

This application discloses an arrangement in which the rollers are supported in yokes that are mounted on a trunnion, and the trunnion can be rotated about an axis that is tangential to the circle formed by the centre of the toroidal cavity. The rotation of the trunnion causes the rollers in the double roller format to "steer" relative to each other so that the conical contact moves slightly off line relative to each roller. That roller then rolls in a direction along the disc surface that causes a ratio change in the variator requiring very little force to execute.

Figure 2:
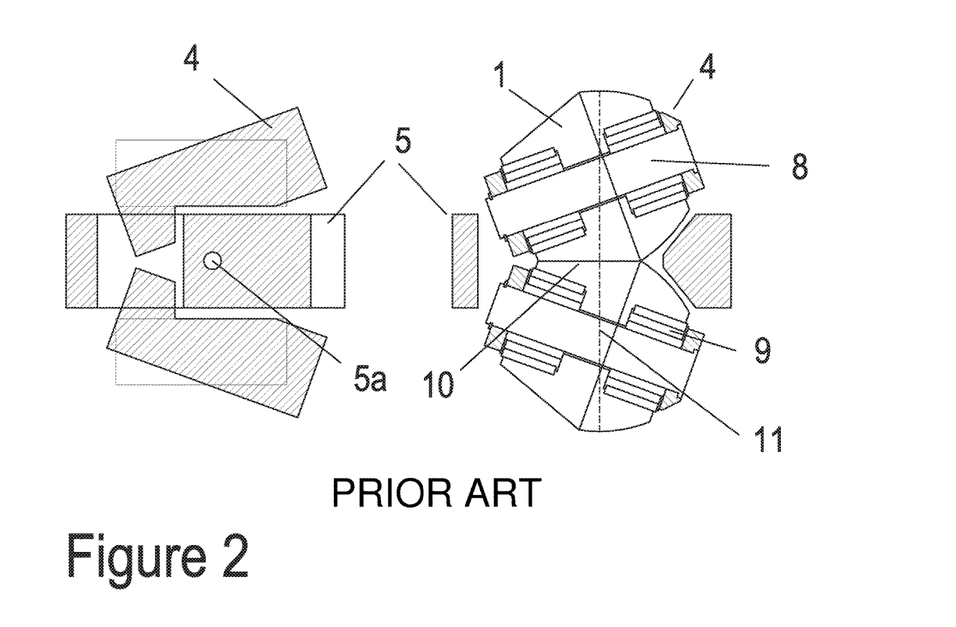
FIG. 2 shows a section through a set of rollers within a second DFTV.

Prior art FIG. 2 depicts such an arrangement in which the rollers 1 are supported on axle bearings 9 that roll on axles 8 that are fixed into yokes 4 that are connected to a trunnion 5 by a ball joint 6. The trunnions 5 can rotate on an axis 5a that generally lies along a line in a plane that is perpendicular to the axis of rotation 24 and that passes through the centre of the toroid 26, and is tangential to the circle that forms the centre of the toroidal cavity. The rollers in their undisplaced position roll on each other on the conical contact line 10.

Yokes 4 are free to rotate on the ball joints (not visible in this view) in any direction, one of these degrees of freedom allowing the rollers 1 to steer when the trunnion 5 is rotated. The line of force 11 is aligned symmetrically and normal to the clamping force.

The steering allows each roller 1 to roll across the toroidal surface 21, 23 and adopt a different ratio position. In their normal rotating state the axes of each of the rollers pass through the axis of rotation of the discs with all three axes lying in the same plane.

It is an object of the present invention to improve the efficiency of a double roller full toroidal variator.

SUMMARY OF THE INVENTION

In a first broad form, the present invention provides an arrangement which reduces or removes the ability of pairs of rollers to move relative to each other along their conical contact.

According to a first aspect, the present invention provides a toroidal variable speed traction drive including a driving disc and a driven disc, said discs having a common axis of rotation, the inner face of each disc being formed with a negative toroidal surface; the discs being forced towards each other in a direction generally parallel to the common axis; a plurality of roller assemblies interposed between said discs, each roller assembly comprising a first and a second roller, each roller having an axis, a toroidal rolling surface by which each roller contacts the toroidal surface of the corresponding disc, and a conical surface, the first and second rollers contacting each other on their respective first and second conical surfaces; wherein an engagement is provided so that any movement between the first and second rollers along the conical surface is reduced.

BRIEF DESCRIPTION OF THE DRAWINGS

Illustrative embodiments of the present invention will be described with reference to the accompanying figures, in which.

Prior Art

Prior art

DETAILED DESCRIPTION OF THE INVENTION

The present invention will be described with reference to specific examples and implementations. However, it will be understood that these are intended to be illustrative of the implementations of the present invention, and not limitative of the scope thereof.

The term toroidal is used to describe both negative and positive surfaces, for example the inside of the toroidal cavity between the input and output discs is a negative toroidal surface. It is also used to described the shape of rollers that engage such a surface, although of course in this case the surface is not a full toroid, it is shaped so that the engagement surface of the roller on the respective disc closely conforms to the toroidal shape on which it runs. It will be understood by the reader that the term is intended take whichever of these meanings is appropriate in the context.

The present invention is specifically concerned with traction systems. In the case of friction systems, contact and force transfer occurs by the interaction of two hard surfaces which effectively lock into each other within their high and low points. In contrast, in traction systems, the hard surfaces do not directly touch and the force is transferred from one surface to the other by the shearing of the thin film of traction fluid between them. In some circumstances, traction drive components may directly engage, however, if a traction drive is operating properly there is zero direct friction and no metal surfaces are touching.

A special fluid called traction fluid is used for the actual force transfer in a traction system. This fluid has the ability to become extremely viscous (almost solid) as it is squeezed between the rollers and the discs. Its ability to transfer force is determined by its "traction coefficient" which is similar to a static friction coefficient. Typically friction coefficients are 1 to 0.3 while traction coefficients are typically considerably less than 0.09.

The type of friction in a friction drive is or can be 100% static with no slide, whereas in a traction drive there must be slide in order to develop a shearing force. Traction drives can never operate without some slip although it could be less than 0.1% it will (must) be there. A friction drive can operate with zero slip although typically there is some slide generally caused by elastic deformation of the surfaces, or because of tolerances in machining.

The term 'axial direction' will be used in relation to the translation of rollers along their conical rolling surfaces. This is to be contrasted with the rolling engagement of the conical surfaces as the rollers rotate and engage. It will be understood that the actual axis of each roller is not parallel to the conical surface, and the axis of each roller is not parallel.

Referring to the arrangement shown in prior art FIG. 2, it has been noted by the inventor that when the rollers steer, one roller is twisted about the steering axis 11 in a clockwise direction and one in an anti clockwise direction, causing the roller axes to move away from the disc rotational axis and the conical contacts to be slightly misaligned. This misalignment causes them to translate relative to each other in an axial direction as they roll along each other. This translation can take place so as to exert a considerable force that is restrained only by the interaction of the curvature of the toroidal surface on the discs and the toroidal surface on the roller. It is only after some considerable axial movement has taken place that a reaction component develops at the toroidal contacts that is sufficiently great enough to resist the force caused by the translation of the rollers along the conical contact.

Figure 3:
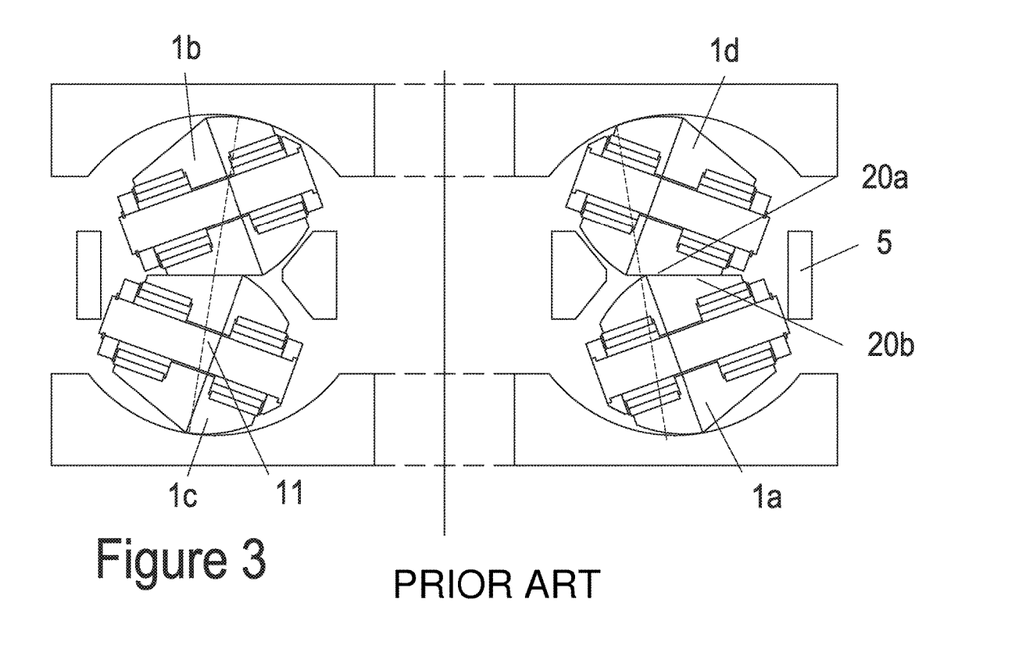
FIG. 3 shows a section similar to FIG. 2, illustrating the relative movement of the rollers.

This translation can be seen in FIG. 3. Two pairs of rollers 1A and 1D, and 1B and 10, can be seen. The rollers have been driven along the conical contact line, with rollers in the direction of the translational force until the movement is arrested at the disc and roller contacts. The rollers in each pair have rotated relative to each other, so that one conical surface 20a and another 20b have moved axially within the cavity displacing the line of force reaction 11. The line of force 11 is accordingly now displaced, to such an extent that its horizontal component is sufficient to equal the force on the rollers and arrest the movement.

When the conical surfaces 20A, 20B become misaligned in this way a force develops that causes the rollers to track along the conical contact in different directions. The only restraint to this movement is provided by the toroidal cavity itself and in a working mechanism during a ratio change the rollers can become significantly displaced from each other and suffer from energy losses associated with differential velocities occurring at both the toroidal and conical contacts. These energy losses result in a loss of CVT efficiency. In FIG. 3, it can be seen that although the trunnion is in the centre position corresponding to a transmission ratio of 1:1 the actual ratio position is quite different, leading to efficiency losses.

This tracking force is of a very large magnitude, because although the movement might be quite slow, its quantum is equal to the friction coefficient times the clamping force, when the traction variator is operating as a friction drive. It is somewhat smaller when the drive is operating in a traction fluid as some progressive creep can occur at the surface, allowing a progressive release of this force as the rollers roll over each other.

This tracking force will also be present to some extent when the rollers are not being steered because in practice it is impossible to control the machining accuracy precisely enough that the conical contacts are so perfect that no misalignment exists from one roller to the next.

It can also be seen that in this displaced and misaligned state, the surface speeds on the conical contact between the rollers in the pair are different where they contact each other. Similarly, the surface speeds on the toroidal contacts of the rollers and discs are no longer the same, which they should be when a double roller variator is in the 1:1 position.

In addition to the force imbalance caused by tracking forces on the conical contact, there is also a twisting force on the rollers caused by speed differences that exist between the contact surfaces of the rollers and discs when the rollers are away from the 1:1 ratio position. This twist is often referred to as spin as it results in a spinning moment transferred into the rollers by the discs. In a single roller full toroidal variator where only one roller is involved the two spinning forces tend to cancel themselves out and the roller itself is left with very little twist.

In this type of double roller device typically one roller is twisted in one direction and the other roller the other, and not necessarily equal amounts, and in some circumstances they can both be twisted in the same direction. The axle will transfer this twist into the yoke which transfers to the ball joint. The only way the twisting force can be balanced is by the roller moving into the side of the toroidal cavity.

When this happens the side of the yoke exerts a force on the side of the roller, which if not properly lubricated using low friction materials will again loose considerable energy. This force can initiate a false steer in the rollers causing the conical surface to generate side slip forces leading to a runaway situation where the rollers although not under steer become significantly misaligned within the toroidal cavity.

In the examples in PCT/AU2012/000467, the rollers are mounted on yokes, and the yokes are fixed to the trunnions using a ball joint. This allows the yokes to rotate in all direction to a limited extent. When the rollers translate along the conical contact once they meet the sides of the yoke (if they have not yet been stabilized by the toroidal cavity itself) they will cause the yoke to rotate further on the ball joint and so cause an even greater steering angle to be created on that roller, further increasing the energy losses. For this reason it is not possible to use the yokes themselves to restrain the rollers.

It is proposed according to implementations of the present invention that the conical surfaces of the rollers are built with a contoured restraint or other engagement that permits one roller to rotate relative to the other along the conical contact, but restricts the relative translation of the rollers along their conical roller surfaces in a axial direction. This constraint can take the form, for example, of a generally circular groove built into one roller that engages a generally circular tongue built into the other. It could also take the form of a number of grooves and tongues, or a complete crowning in one with a dish in the other. The conical surface can support the clamping force with the groove/tongue supporting the translation force or the surfaces so arranged that they support both forces simultaneously.

Because the rollers are rolling on each other there is very little sliding of the surfaces involved in the profiled restraint. The movement is predominantly one of rolling similar to the rolling experienced by a tapered roller in a tapered roller bearing.

Figure 4:
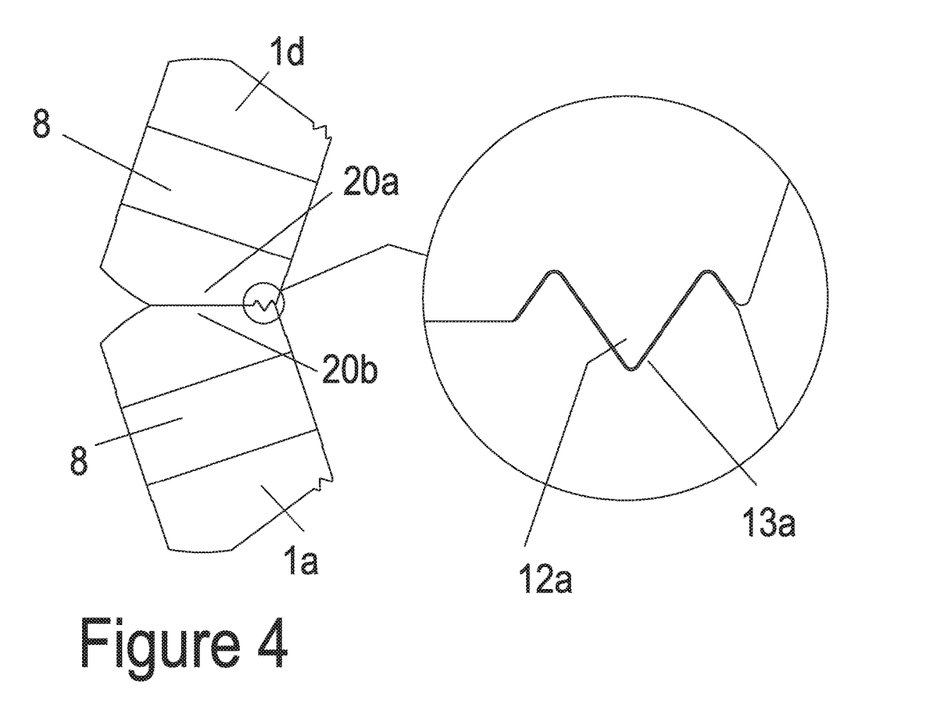
FIG. 4 is a section and detailed view of rollers modified according to a first implementation of the present invention.
Figure 5:
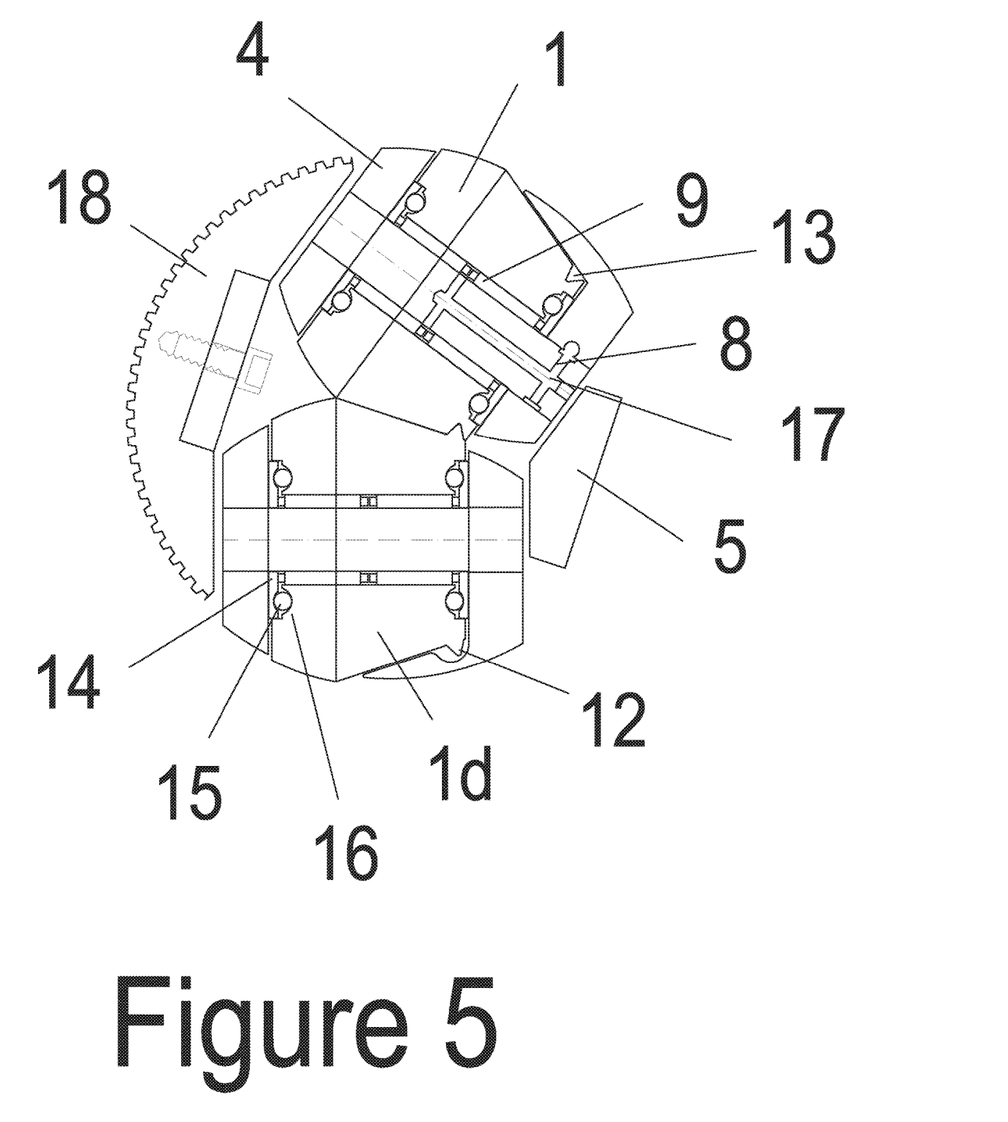
FIG. 5 is a more general view of the implementation of FIG. 4, in section.

FIG. 4 shows a section through two such rollers that have been modified in this way. Each roller is formed with surface features that providing interlocking annular projections 12a and indentations 13a that are built into the conical surfaces 20a and 20b of the rollers. Because the surface features are symmetrical about the respective rotational axes of each roller, they interact without substantially altering the transfer of force through the conical surface contact. However, the features greatly reduce the scope for axial relative movement of the rollers FIG. 5 shows a more detailed view of the arrangement of FIG. 4. Trunnion 5 is provided with a gear 18 that enables it to be rotated. The rollers 1 are provided with an interlocking annular groove 13 and an annular tooth 12. They run on axles 8 which are provided with oil galleries 17, to provide lubrication to bearings 9 supplied through the yokes 4 from gallery 8. The ends of the rollers are provided with annular track 16 in which roll ball bearings 15 on a matching track 14 which is restrained by the yoke.

In this implementation the engaging surfaces do not support any of the main clamping load. Only the large conical section of the two rollers supports the thrust force.

Figure 6:
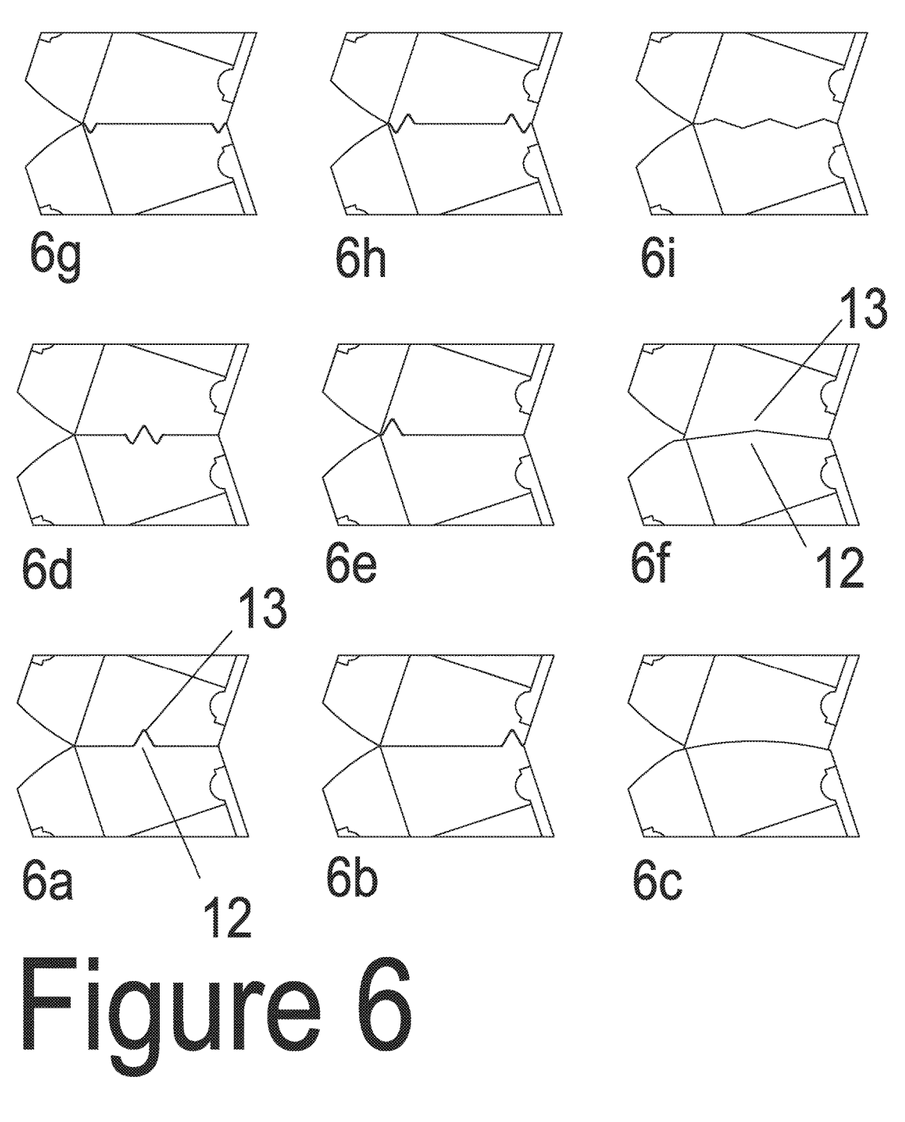
FIGS. 6A to 6I illustrate alternative roller modifications according to the present invention.

FIG. 6A to 6I illustrate alternative surface features to provide the restraint or engagement. FIG. 6b illustrates a similar restraint to FIG. 5. FIG. 6e illustrates an arrangement where the features where it is placed at the other end of the conical surface, and FIG. 6a where it is in the centre. FIGS. 6g and 6h show arrangements where two smaller restraints are provided, and FIG. 6i shows an implementation where there are many. FIG. 6d uses a balanced number of features designed to reduce differential speeds. FIGS. 6f and 6c show implementations where the restraint is built into the entire length of the conical contact with one being a double cone and one being a form of toroid.

It will be apparent that these are only some possible implementations, and that many other alternatives which achieve the objectives of the engagement or restraint can be postulated and implemented in suitable designs.

The clearance of the groove in one roller to the teeth in the other is very small and immediately any side force is created by the tracking force on the conical surface it is counterbalanced by the other. The clearance although small is enough to allow the rollers to steer the small amount needed to achieve a ratio change. With a system that is based on a toroidal cavity radius of 30 mm the conical contacts are typically around 12 mm long. Without the engagement they could easily become displaced by 2 mm or 20% of their length before the toroidal cavity would stop the movement. This causes a typical loss of efficiency of over 2% and other problems with speed control.

In an implementation of this scale, the grooves typically leave a clearance of 50 microns (25 microns both sides) between the tongue and groove, and so the movement is restraining the movement to less than 100 microns along the length of the conical contact, or less than 1% of the length of that contact. Preferably, the displacement of one roller to the other along the conical contact is restricted by the restraint to less than 10% of the length of the conical contact, most preferably less than 2%.

Considered in another way, the clearance should allow for axial movement in either direction along the conical contact which is less than what could occur if the restraint or engagement was not in place. Preferably, the movement is less than 30% of what it would be if the restraint was not in place, most preferably about 5%.

The relative speeds of the sides of the teeth and the sides of the grooves are very similar as the rollers are rolling in opposite directions. Very little energy is lost associated with this and always much less than that lost by the sliding that exists when rollers become misaligned.

Figure 9:
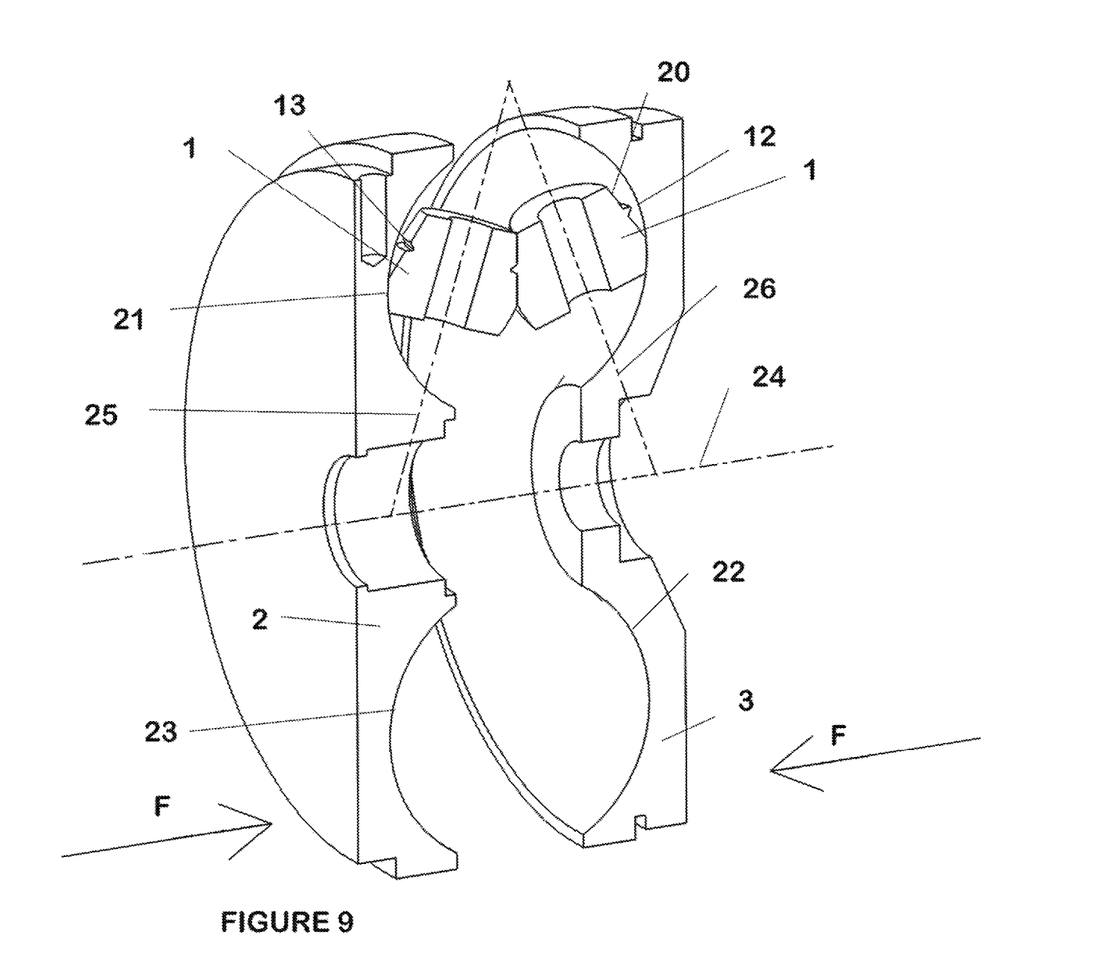
FIG. 9 is an exploded view, showing the discs and the toroidal cavity.

In order to ensure that the sliding between the rollers and Yokes is minimised rolling element bearings are introduced into the ends of the rollers as shown in FIG. 9. In this case a single groove 13 is formed in one roller and a single tooth 12 in the other.

The rollers 1 run on bearings 9 that run on axles 8 fixed into Yokes 4 which are connected to Trunnions 5. Between the sides of the rollers and the yoke is a circle of ball bearings 15 running in a race formed in a thrust washer 14 and the roller 16 race. The axle is fed down its centre with oil 17 fed from a gallery in the yoke that in turn is fed from the ball connection in the trunnion. The trunnion is rotated using a gear 18.

Figure 7:
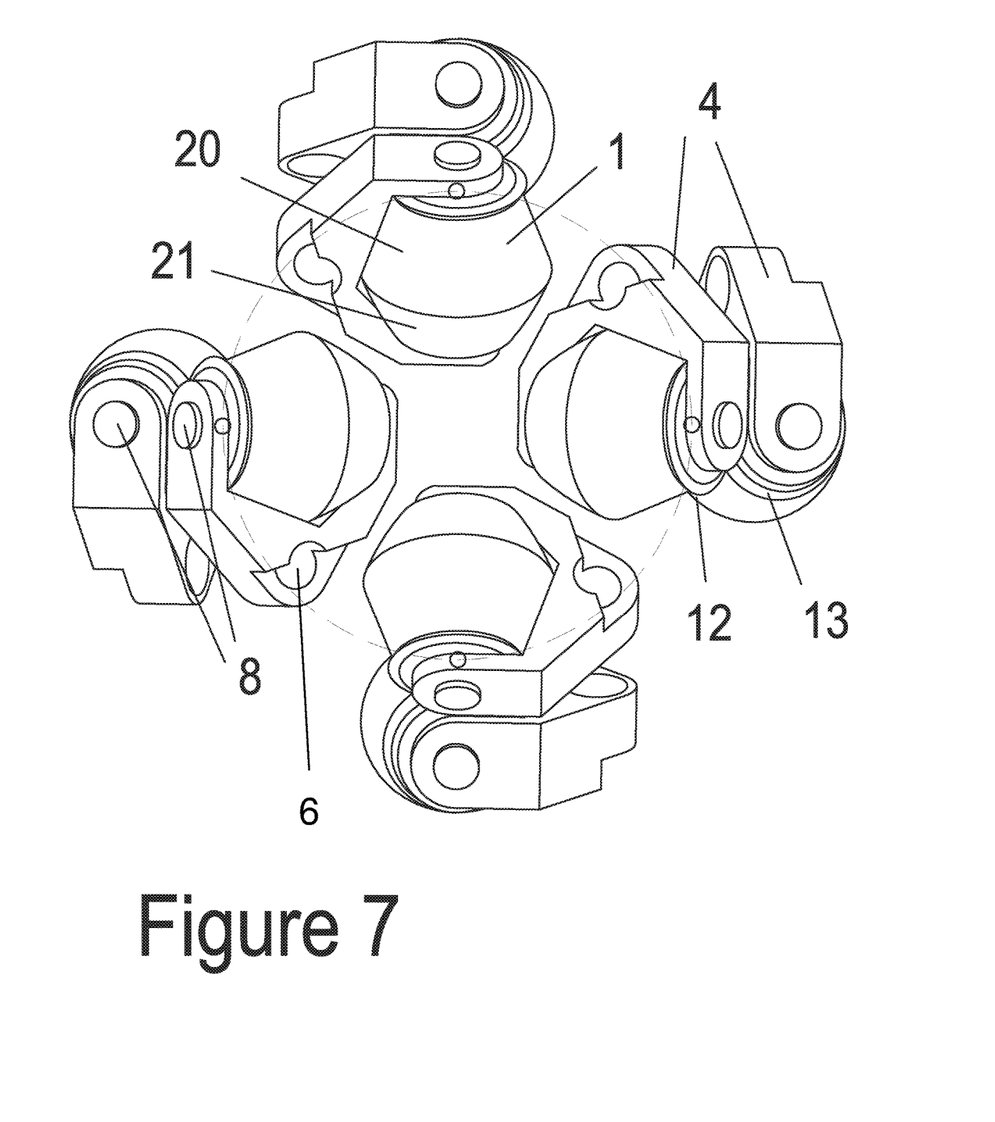
FIG. 7 shows an exploded plan view of an implementation, showing four pairs of rollers and their supporting yokes.

FIG. 7 shows an exploded plan view of four pairs of rollers and their supporting yokes. In this case the rollers 1 are in a position that would deliver an extreme high or low ratio. The interaction of the grooves and teeth 12, 13 can be seen on each pair of rollers.

Figure 8:
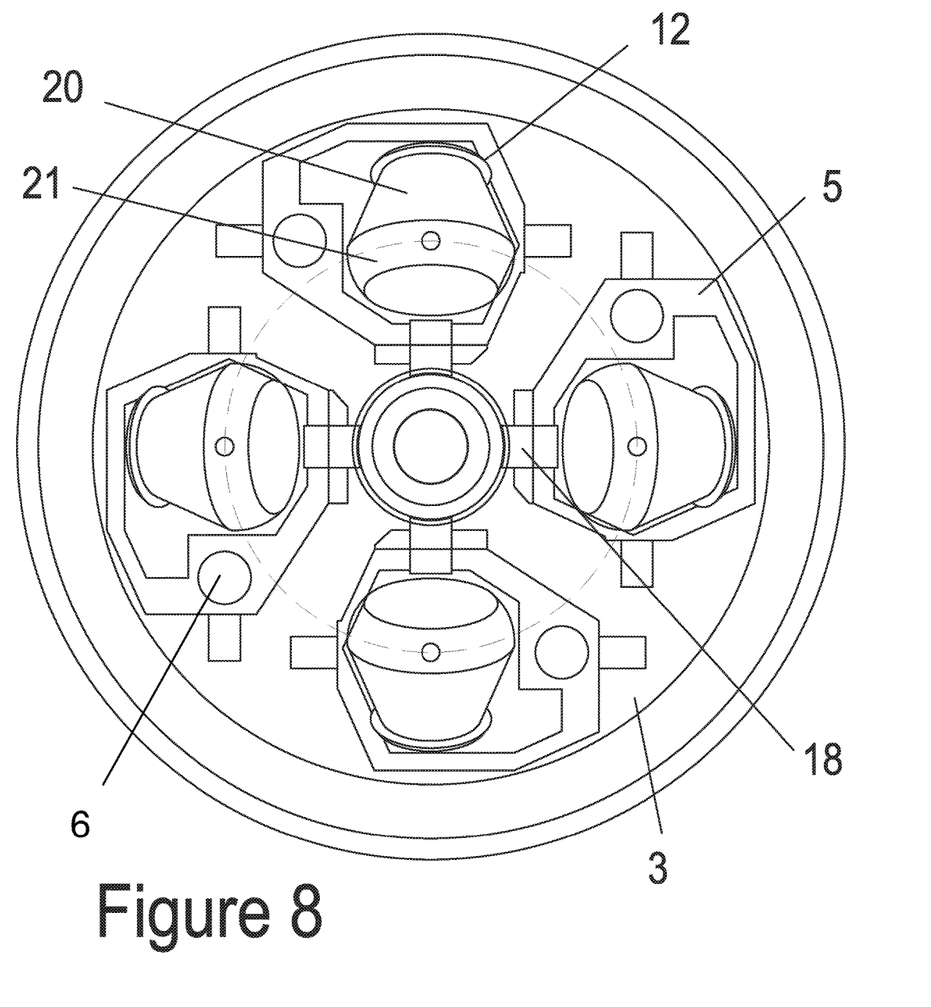
FIG. 8 is a view similar to FIG. 7, but with the yokes removed for clarity.

FIG. 8 is a similar view to FIG. 7 in which the trunnions are shown with the yokes removed and the rollers in a 1:1 gear ratio. The arrangement of the pairs of rollers around the toroidal cavity can be seen, with the input disc 3.

FIG. 9 is an exploded section showing the two discs 2 and 3 clamped by the clamping forces F. Discs 2, 3 include toroidal surfaces 23 and 22, which combine to define a negative toroidal surface. The toroidal surfaces 22, 23 are urged by the clamping force F onto the toroidal surfaces of the rollers 1, which in turn are urged together and engage on their the conical surfaces 20. The rollers run on the axes 25 and 26 while the discs both rotate on axis 24. The tongue 12 and groove 13 can be seen.

The present invention is applicable to any double roller CVT system, for example the DRS system in the prior referenced patent. In any paired conical roller system, if the rollers are misaligned either by the application of steering or by loss of manufacturing tolerance they will track along each other (with a high force). Even if the rollers are restrained by the sides of a fixed yoke, an engagement according to the present is generally preferable because it operates without significant differential velocity. It is similar to the way a tapered roller bearing is restrained in its race by the edge of the roller rolling along the edge of the race but at more or less the same speed.

It will be appreciated that the present invention may be implemented in many variations, and is not limited to the examples and applications described. Similarly, it is envisaged that additional features and components may be added to implementations of the present invention.

The invention claimed is:

1. A toroidal variable speed traction drive including a driving disc and a driven disc, said discs having a common drive axis of rotation, the inner face of each disc being formed with a negative toroidal surface; the discs being forced towards each other in a direction generally parallel to the common drive axis; a plurality of roller assemblies interposed between said discs, each roller assembly comprising a first and a second roller, each first and second roller each having a toroidal rolling surface by which each first and second roller contacts the toroidal surface of the corresponding disc, and each first second roller having a first conical surface and a first axis, and each second roller having a second conical surface and a second axis, the first and second axis being non-parallel, the first and second rollers contacting each other on their respective first and second conical surfaces, wherein interacting annular features having projections and corresponding grooves are provided on said first and second conical surfaces, which features allow rolling contact of the first and second rollers along their conical surfaces but substantially prevent translation of the first or second axes relative to each other.

2. A drive according to claim 1, wherein the axis of the first roller and the axis of the second roller generally pass through the common axis.

3. A drive according to claim 1, wherein the rollers, the driven disc and the driving disc operatively do not touch.

4. A drive according to claim 1, wherein each roller assembly is supported by a yoke, and each yoke is connected to a corresponding trunnion by a ball joint.

* * * * *